US009886645B2

(12) United States Patent
Pitts et al.

(10) Patent No.: US 9,886,645 B2
(45) Date of Patent: Feb. 6, 2018

(54) IMAGE REGISTRATION VIA OPTIMIZATION OVER DISJOINT IMAGE REGIONS

(71) Applicant: National Technology & Engineering Solutions of Sandia, LLC, Albuquerque, NM (US)

(72) Inventors: Todd Pitts, Rio Rancho, NM (US); Simon Hathaway, Albuquerque, NM (US); David B. Karelitz, Albuquerque, NM (US); John Sandusky, Albuquerque, NM (US); Mark Richard Laine, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 337 days.

(21) Appl. No.: 14/270,129

(22) Filed: May 5, 2014

(65) Prior Publication Data
US 2014/0334735 A1 Nov. 13, 2014

Related U.S. Application Data

(60) Provisional application No. 61/821,375, filed on May 9, 2013.

(51) Int. Cl.
G06K 9/46 (2006.01)
G06K 9/32 (2006.01)
G06T 7/33 (2017.01)

(52) U.S. Cl.
CPC ......... *G06K 9/4671* (2013.01); *G06K 9/3233* (2013.01); *G06T 7/337* (2017.01); *G06T 2207/20021* (2013.01)

(58) Field of Classification Search
None
See application file for complete search history.

(56) References Cited

U.S. PATENT DOCUMENTS 7,457,439 B1 * 11/2008 Madsen ................ G06T 7/2033
348/154
8,155,452 B2 4/2012 Minear
8,380,007 B2 2/2013 Chan et al.
8,401,333 B2 3/2013 Miyakawa et al.
8,406,491 B2 3/2013 Gee et al.
(Continued)

OTHER PUBLICATIONS

Brown, "A Survey of Image Registration Techniques", ACM Computing Surveys, 1992, pp. 1-60.
(Continued)

*Primary Examiner* — Fred Hu
(74) *Attorney, Agent, or Firm* — Medley, Behrens & Lewis, LLC

(57) ABSTRACT

Technologies pertaining to registering a target image with a base image are described. In a general embodiment, the base image is selected from a set of images, and the target image is an image in the set of images that is to be registered to the base image. A set of disjoint regions of the target image is selected, and a transform to be applied to the target image is computed based on the optimization of a metric over the selected set of disjoint regions. The transform is applied to the target image so as to register the target image with the base image.

17 Claims, 5 Drawing Sheets

(56) References Cited

U.S. PATENT DOCUMENTS

| | | | |
|---|---|---|---|
| 2004/0114800 A1* | 6/2004 | Ponomarev | G06T 7/0012 |
| | | | 382/173 |
| 2005/0094898 A1 | 5/2005 | Xu et al. | |
| 2005/0147325 A1 | 7/2005 | Chen et al. | |
| 2008/0187234 A1 | 8/2008 | Wantanabe et al. | |
| 2009/0041314 A1* | 2/2009 | Vercauteren | G02B 21/367 |
| | | | 382/128 |
| 2013/0004035 A1* | 1/2013 | Chung-Ming | G06T 7/0028 |
| | | | 382/128 |

OTHER PUBLICATIONS

Klein, et al., "elastix: A Toolbox for Intensity-Based Medical Image Registration", IEEE Transactions on Medical Imaging, vol. 29, No. 1, Jan. 2010, pp. 196-205.

* cited by examiner

IMAGE REGISTRATION VIA OPTIMIZATION OVER DISJOINT IMAGE REGIONS

CROSS-REFERENCE TO RELATED APPLICATIONS

This application claims the benefit of U.S. Provisional Application No. 61/821,375, filed May 9, 2013, which is incorporated herein by reference.

STATEMENT OF GOVERNMENTAL INTEREST

This invention was developed under Contract DE AC04-94AL85000 between Sandia Corporation and the U.S. Department of Energy. The U.S. Government has certain rights in this invention.

BACKGROUND

Image registration is the process of placing multiple images, which may have different coordinate systems corresponding thereto, into a common coordinate system. When registering images, mathematical functions, referred to as transforms, are computed and employed to transform the images into the common coordinate system. To perform such task, a base image is selected from amongst a set of images, where the base image is associated with a particular coordinate system (e.g., the common coordinate system). Subsequently, other images in the set of images are registered with the base image, thereby associating each image in the set of images with the common coordinate system.

When performing image registrations, one of two registering techniques is generally employed: 1) feature-based registration; or 2) optimization-based registration. In feature-based registration, features are extracted from images using a suitable feature extraction technique, and, for instance, a feature that exists in numerous images is identified. The location of such feature is identified 1) in each image in which the feature is found to exist; and 2) in a respective coordinate system of an image from which the feature is extracted. A transform may then be computed as a function of the locations of the feature across the images. It is recognized, however, that image registration can be complex for large image collections, where images therein include numerous features. Additionally, an assumption in any registration is that features or regions in the imagery maintain the same spatial relationship with respect to one another in the scene over time. Also, general distortion of the imagery (as is commonly present in imaging systems) generally precludes accurate registration unless it is taken into account during the registration process.

Optimization-based registration minimizes a difference metric that operates on image values directly. An optimization function iteratively adjusts a transform for an input (moving) image relative to the base (stationary) image, evaluates the accuracy of the transform using a metric that indicates an amount of correlation between the image and the base image, and ceases operation when the accuracy of the transform meets a threshold or the number of iterations meets a threshold. Optimization-based registration is typically more computationally intensive than feature-based methods.

SUMMARY

The following is a brief summary of subject matter that is described in greater detail herein. This summary is not intended to be limiting as to the scope of the claims.

Described herein are various technologies pertaining to image registration. In a general embodiment, an image registration algorithm is described herein that employs an optimization metric that is computed over a selected, disjoint set of separately normalized image regions. This allows the exclusion of regions that include entities subject to motion that is inconsistent with a portion of the scene that is desirably registered (e.g., motion antithetical to the motion being computed by the image registration) (e.g., erroneous objects, moving entities, . . . ). Furthermore, the employment of the disjoint set to compute the optimization metric facilitates choosing a subregion of a scene for restoration and allowing the algorithm to avoid registration error due to parallax or other sources of error incurred by use of an entire image.

Regions in the disjoint set of regions can be automatically or manually selected, and can be chosen to lie in a region that exhibits minimum parallax over images in the set of images to be registered. The algorithm described herein includes numerous acts, including base image selection, selection of the disjoint set of image regions, computation of the optimization metric over the disjoint set of image regions, the performance of optimization to effectively minimize error (e.g., a Nelder-Mead simplex-based optimizer), averaging of registered images as well as adjustment of gain, optical distortion correction, and implicit detection of consistent image regions. These acts are described in greater detail herein.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
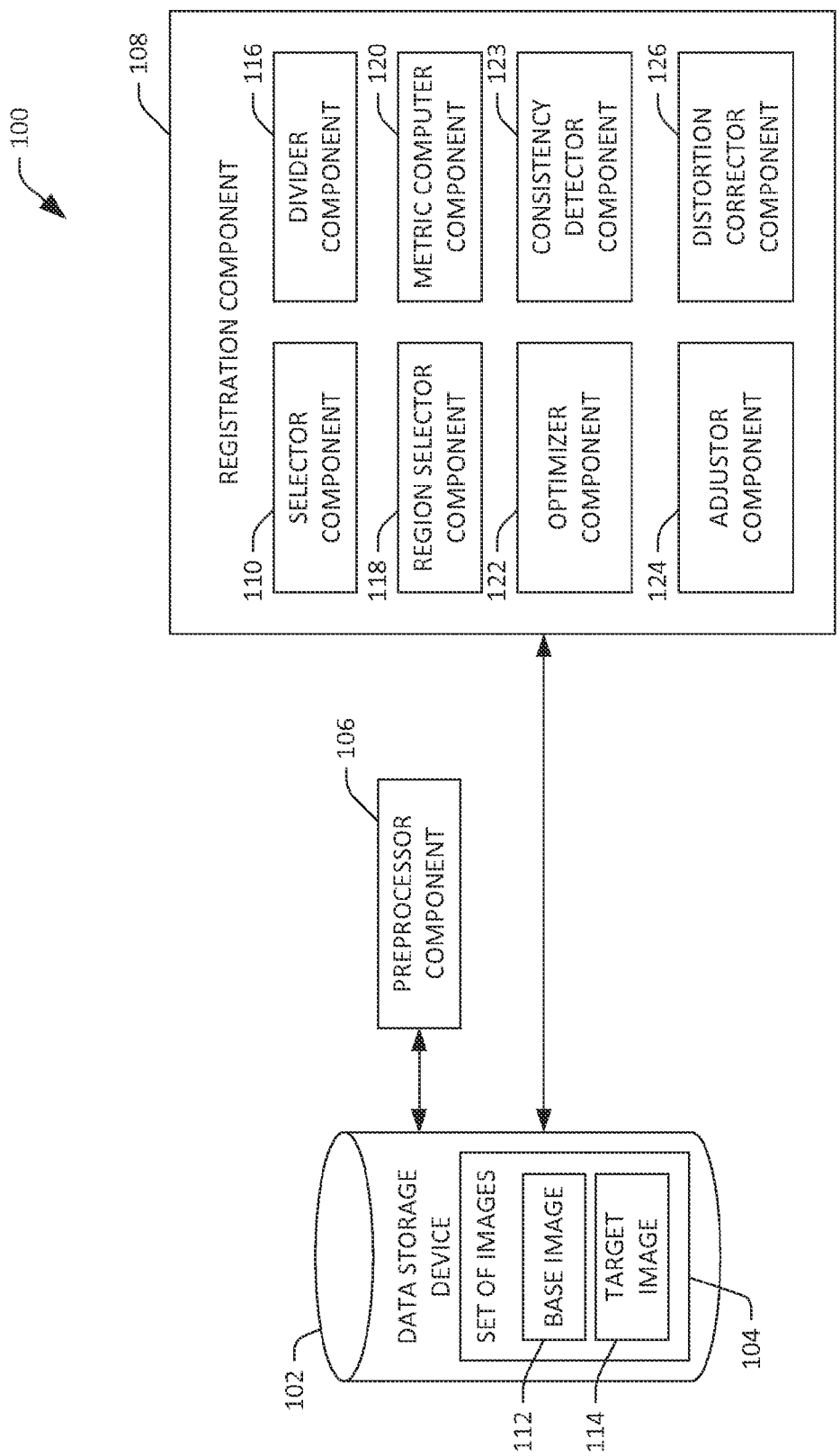
FIG. 1 is a functional block diagram of an exemplary system that facilitates registering a target image to a base image.

Various technologies pertaining to image registration are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

In alternative embodiments, the image registration techniques described herein can be used in a variety of applications, including but not limited to surveillance, medical imaging (e.g., computed tomography imaging, radiometric imaging), space or orbital photography, inspection of devices, photogrammetric applications, amongst others. Further, the image registration techniques described herein can be employed in connection with generating a high resolution image from a plurality of lower resolution images.

Referring now to FIG. 1, a functional block diagram of an exemplary system 100 that facilitates registering images to a base image is illustrated. As will be described below, image registration is undertaken based upon selection of disjoint regions of images subject to registration. The system 100 can be comprised by any suitable computing device, such as a desktop computer, a server, a laptop computer, a tablet (slate) computer, a mobile telephone, a digital camera, other mobile computing device, or the like. The system 100 includes a data storage device 102, such as a memory, a hard disk, a flash drive, etc., that includes a set of images 104 of a scene, wherein the set of images 104 are desirably subjected to registration.

The system 100 may further optionally include a preprocessor component 106 that performs acts of preprocessing on images in the set of images 104. Preprocessing that can be performed by the preprocessor component 106 includes correcting non-uniformity of pixels, correcting optical distortion, and identifying "dead" or "hot" pixels. With respect to non-uniformity of pixels, differing pixels across images in the set of images 104 may have differing gains and offsets, which can be corrected/normalized by the preprocessor component 106. The preprocessor component 106 can perform a pixel-by-pixel affine transformation on intensity. For instance, a measured darkfield image can be subtracted from each image in the set of images 104, and each pixel can be scaled by its own gain coefficient (obtained by way of a flat field image correction). With respect to correcting optical distortion, if the set of images 104 is captured when motion is involved (e.g., the camera is moving), or if a camera lens is relatively thick, which causes optical distortion to occur, the preprocessor component 106 can cause coordinate systems associated with images in the set of images 104 to be placed in respective Cartesian coordinate systems (and thus correct for the distortion).

With respect to identifying "dead" or "hot" pixels, many imaging systems (e.g., cameras) include sensors with "dead" (no response) sensor elements or "hot" (high count values without corresponding brightness in the scene) sensor elements, resulting in "dead" or "hot" pixels. The preprocessor component 106 can mark the dead and hot pixels (e.g., via a mask image) with non-inclusion markers. For instance, the preprocessor component 106 can replace values for such pixels with NaN (not a number) values. As will be described in greater detail below, these NaN values can be propagated during image stabilization operations, such that pixels assigned NaN values and any pixels with interpolated values depending thereon are rendered as NaN values, thereby excluding such pixels/values when computing a normalized correlation metric.

The system 100 additionally comprises a registration component 108 that can perform image registration over images in the set of images 104 (e.g., subsequent to being processed by the preprocessor component 106). As will be described in greater detail below, the registration component 108 can perform image registration through selection of a disjoint (non-overlapping) set of regions from images in the set of images 104.

In more detail, the registration component 108 can include a selector component 110 that receives the set of images 104 from the data storage device 102. The selector component 110 selects and labels an image in the set of images 104 as a base image 112, wherein other images in the set of images 104 are to be registered with the base image 112. That is, the base image 112 is associated with a particular coordinate system, and other images in the set of images 104 are desirably subject to transformation such that all images in the set of images 104 are associated with the coordinate system of the base image 112 (a common coordinate system). In an exemplary embodiment, the selector component 110 can select the base image 112 from the set of images 104 based upon timestamps assigned to images in the set of images 104. For instance, images in the set of images 104 may be captured in a sequence, and the selector component 110 can analyze timestamps assigned to respective images in the set of images 104 and select an image in the set of images 104 that is in the middle of the sequence as the base image 112. In another exemplary embodiment, a user can manually select the base image 112 from the set of images 104. Images in the set of images 104 that are to be registered with the base image 112 are referred to as target images; thus, the set of images 104 also includes a target image 114.

The registration component 108 further includes a divider component 116 that, for each target image in the set of images, divides a respective target image into a plurality of disjoint (non-overlapping) regions. For purposes of explanation, remaining actions are described with respect to a single target image (the target image 114); it is to be understood, however, that actions described as being undertaken with respect to the target image 114 can be repeated for each target image in the set of images 104. Hence, the divider component 116 divides the target image 114 into a plurality of regions, wherein a number of regions in the plurality of regions can be pre-specified. For instance, the divider component 116 can divide the target image 114 into five regions, ten regions, thirty regions, etc. Furthermore, the divider component 116 can divide the target image into the plurality of regions as a function of a user-specified region. Additionally, the divider component 116 can divide the target image 114 into uniform-sized regions or regions of varying sizes.

The registration component 108 further comprises a region selector component 118 that selects a candidate set of regions from the plurality of regions, wherein regions in the candidate set of regions are identified by the region selector component 118 as being well-suited for use when computing transforms to apply to the target image 114 to register the target image 114 with the base image 112. The region selector component 118 can select the candidate set of regions by computing a selection metric value for each region in the plurality of regions, and can select regions from the plurality of regions based upon their respective selection metric values (e.g., the selector component 118 selects a threshold number of regions with respective highest selection metric values as the candidate set of regions).

In an exemplary embodiment, in connection with computing the selection metric value for each region in the target image 114, the region selector component 118 can compute the auto-correlation function for a respective region. In another exemplary embodiment, the region selector component 118 can perform a Taylor series expansion of the autocorrelation function for the respective region, which may be faster to compute and very nearly as useful as computing the auto-correlation function. Regions of the image possessing relatively high auto-correlation functions may provide an advantageously shaped total optimization metric. The region selector component 118 may then employ an autocorrelation threshold test to select the regions from the plurality of regions to include in the candidate set of regions.

In some applications, however, it may be desirable to select an "optimal" candidate set of regions while considering a constraint on a number of pixels or regions to be processed. Accordingly, in an exemplary embodiment, the region selector component 118 can compute the Jacobian of the feature-based estimate of a chosen registration transform (e.g., a translation transform, a similarity transform, an affine transform, a full projective transform, . . . ). The Jacobian expresses how the uncertainty in feature location due to blur and noise maps to uncertainty in a registration parameter (e.g., a parameter of a transform used during registration). For example, the separation between examined regions combined with the narrowness of the autocorrelation of the data in each region can aid in determining the viability of angular registration accuracy. It is to be understood that the region selector component 118 uses the estimator of the transform (based upon feature locations) rather than the transform itself to identify the "optimal" candidate set of regions. For instance, the region selector component 118 can use the minimization of the variability of the most mobile pixel (in a user-specified region of interest) as the selection metric value.

The region selector component 118 then computes the transform (feature-based) assuming exact location knowledge of features in the base image 112, no motion of the target image 114 (same actual feature locations as in the base image 112), and assumed errors in the measured or computed feature locations in the target image 114 equal to the autocorrelation widths of the actual features (these widths are obtained from the features in the base image 112). A correct answer would be "no motion" or the identity transform, as the correct feature locations in the target image 114 can be assumed to be identical to their respective locations in the base image 112. Due to the uncertainty in feature location in the target image 114 (represented by the autocorrelation widths of the features measured in the base image 112), it can be ascertained that such a correct answer is unlikely. Still further, the region selector component 118 can walk through errors in their various combinations, obtaining for each location a measure of the uncertainty introduced into the transform (e.g., such measure may be a size of the excursion a pixel moving the furthest distance from its original location under the transform, although other metrics are contemplated); accordingly, only the transform which deviates the most from the identity transform retained for analysis. In an exemplary embodiment, the retained transform may be the transform under which the largest pixel excursion is maximized. Such distance can be the value of the metric for the set of regions and autocorrelation widths. The region selector component 118 then moves onto another set of regions (and corresponding autocorrelation widths). Each possible set of regions can be tested in this fashion. The region selector component 118 can select the set of regions which produces the smallest excursion for the pixel moving the furthest from its correct location as the selected, "optimal" candidate set of regions. Additionally, in another exemplary embodiment, a user can manually select the candidate set of regions from the target image 114 for purposes of registering the target image 114 with the base image 112.

The registration component 108 can additionally include a metric computer component 120 that receives as input the candidate set of regions in the target image 114 selected by the region selector component 118. The metric computer component 120 computes an optimization metric for the target image 114 for use when adjusting parameters of the above-mentioned chosen transform, wherein the metric computer component 120 computes the metric based on the selected set of regions. In an exemplary embodiment, the metric computer component 120 can compute the optimization metric as a weighted sum of locally (over each distinct image region in the candidate set of regions) normalized correlation merit functions, which allows features in both bright and dark regions of the image to contribute to the total fit figure of merit based on local shape matching without distortion from local mean brightness. Weights in the metric summation may be specified as uniform or chosen to be proportional to a number of non-NaN pixels in each region in the candidate set of regions in the target image 110. Thus, pixels marked with NaN values by the preprocessor component 106 are effectively ignored by the metric computer component 120, as well as pixels that are based upon pixels marked with NaN values (e.g., interpolated values that are based upon NaN values). In other embodiments, weights in the metric summation can be computed by the metric computer component 120 based upon a Taylor series expansion of the sum of squared differences metric.

An optimizer component 122 receives the optimization metric computed by the metric computer component 120, the candidate set of regions of the target image 114 identified by the region selector component 118, and the base image 112, and adjusts parameters of the chosen transform that is to be applied to the target image 114. Thus, the optimizer component 122 receives the chosen transform (e.g., translation, similarity, affine, full projective, . . . ), and adjusts parameters of the transform through utilization of a suitable optimization function (e.g., optimized for the optimization metric computed by the metric computer component 120). When adjusting the parameters, the optimizer component 122 can effectively subject all pixels in the candidate set of regions to the transform, while pixels not in the set of regions are not subjected to the transform. A pixel for pixel comparison can then be undertaken between the transformed pixels and corresponding pixels of the base image 112, and the optimizer component 122 can adjust parameters of the transform such that the optimization function of the optimizer component 122 is optimized with respect to the metric computed by the metric computer component 120.

The optimizer component 122 can utilize an optimization framework in connection with setting parameters of the transform for use when registering the target image 114 with the base image 112, while minimizing error during registration. Robust optimization performance can be achieved through use of a coarse parameter grid search prior to initializing a Nelder-Mead simplex-based optimizer, although other optimizer frameworks are contemplated. In other embodiments, the optimizer component 122 can employ a multi-resolution (scale-space) optimizer when computing the transform.

The registration component 108 further optionally includes a consistency detector component 123 that can selectively detect and exclude regions in the target image 114 for subsequent use by the optimizer component 122 when further adjusting parameters of the transform to be applied to the target image 114. For example, it may be possible that one or more regions in the set of candidate regions selected by the selector component 110 may include an element that includes motion (e.g., a shadow or other element). Accordingly, while such region may initially be identified as being well-suited for computing the transform, it may be sub-optimal (since the base image 112 may not include the element or the element may be in a different location in the scene with respect to other scene features). Thus, the consistency detector component 123 can receive the candidate set of regions from the region selector component 118 (or optionally can analyze all regions in the target image 114), and can operate in conjunction with the metric computer component 120 and the optimizer component 122 to selectively exclude at least one region from the candidate set of regions (if inconsistency is detected in the at least one region). Remaining regions can be referred to as registration regions, and can be employed to register the target image 114 with the base image 112.

In connection with detecting regions to exclude, the consistency detector component 123 can be configured to separate, for instance, the candidate set of regions into inliers (regions moving in a self-consistent manner) and outliers. For example, for purposes of explanation, it can be assumed that the number of regions in the candidate set of regions is n. The consistency detector component 123 can form a list of all possible binary partitions of the n regions (representing "good regions" and "bad regions" or "inliers" and "outliers"). For each element in the list, the metric computer component 120 can compute an average optimization metric. The consistency detector component 123 may then compute a difference between mean optimization metrics to obtain a single value that can be used as an optimization metric for the certain partitioning.

The consistency detector component 123 can treat the "all inlier" partition by comparing such partition with the zero correlation case. The optimizer component 122 can then adjust the selected transform for each possible partition of regions, and the consistency detector component 123 can select the partition of "good regions" with the best transformation performance as the registration set of regions. Effectively, then, the consistency detector component 123 excludes regions from the candidate set of regions that include extraneous motion, and would thus be detrimental for use when adjusting parameters of the transform for the target image 114. The registration component 108 can register target images in the set of images 104 with the base image 112 using respective transforms adjusted by the optimizer component 122 as a function of the candidate set of regions output by the region selector component 118. Further, the registration component 108 can register target images in the set of images 104 with the base image 112 using respective transforms based upon registration regions identified by the consistency detector component 123. The output of the registration component 108 can be a final image (in the coordinate system of the base image 112).

The registration component 108 can also optionally include an adjustor component 124 that can normalize brightness and correct for differences in gain between overlapping pixels in the final image. With more particularity, some registration applications, such as defect detection applications, may require averaging of registered imagery (as opposed to simple stabilization). Overall scene brightness differences may be present due to changes in lighting or imager (camera) integration/gain settings. In such cases, areas beyond an image border (brought into the center of the base image 112) or masked (dead/hot) pixels may create artifacts in the final image. The adjustor component 124 can analyze a stack of registered (but not averaged) images, and can adjust for the aforementioned differences in scene brightness and artifacts. The adjustor component 124 can compute the scene region common to all registered images in the set of images 104, and can further compute the mean of each image. The adjustor component 124 then multiplies each image by a scalar factor that is calculated to leave the brightness in the overlapping region the same for each image. After this adjustment, the adjustor component 124 can average the image stack on a pixel-by-pixel basis (taking into account the actual number of pixels contributing to each location in the final image).

The registration component 108 can further include a distortion corrector component 126, which can perform optical distortion correction as part of the interpolation process during image registration, or as a part of pre-registration preprocessing. If the distortion corrector component 126 is configured to correct optical distortion during pre-registration processing, a distortion measurement that is indicative of an amount of distortion in an image can be obtained through utilization of conventional techniques. When used to perform optical distortion correction as part of the interpolation process during image registration, the distortion corrector component 126 only needs to perform interpolation a single time on the final image (prior to the adjustor component 124 performing averaging/gain adjustment on the final image). In some cases, this can result in a relatively high quality, sharp final image. Whether the distortion corrector component 126 is configured to perform distortion correction during pre-registration processing or during image registration can be a function of the application. For instance, if high fidelity distortion measurements are available, such measurements can be used during an interpolation step for registration (as opposed to being applied completely during pre-registration corrections). If the distortion is unknown (e.g., a camera used to capture images is unavailable and pre-imaging measurement of distortion is unavailable), then distortions can be solved for during registration. If distortion correction is desired, then solving for such correction during registration may be preferred.

In an exemplary embodiment, the system 100 can execute at a video frame rate; hence, the system 100 can register images in real-time as images of a scene are captured. Additionally, images in the set of images 104 can be of any suitable resolution, such as, but not limited to, 640×480 pixels, 1200×1600 pixels, etc.

Figure 2:
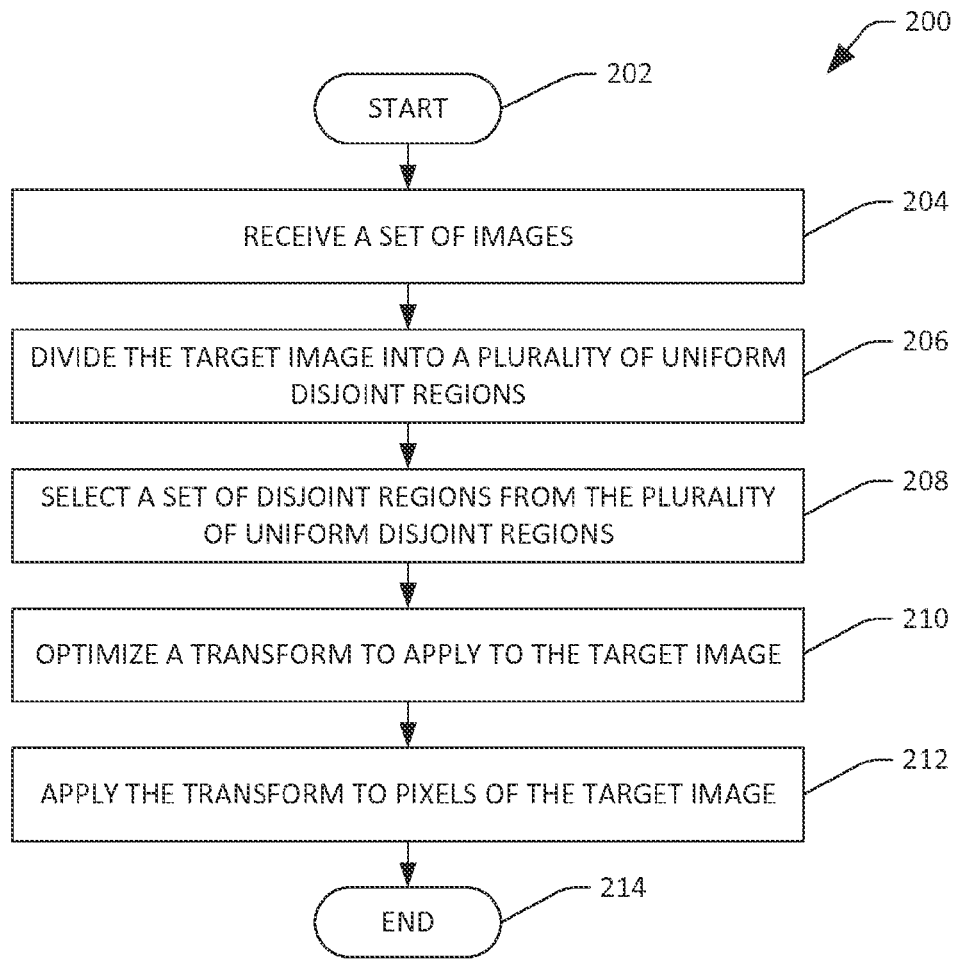
FIGS. 2-4 illustrate exemplary methodologies that facilitate registering a target image to a base image.
Figure 3:
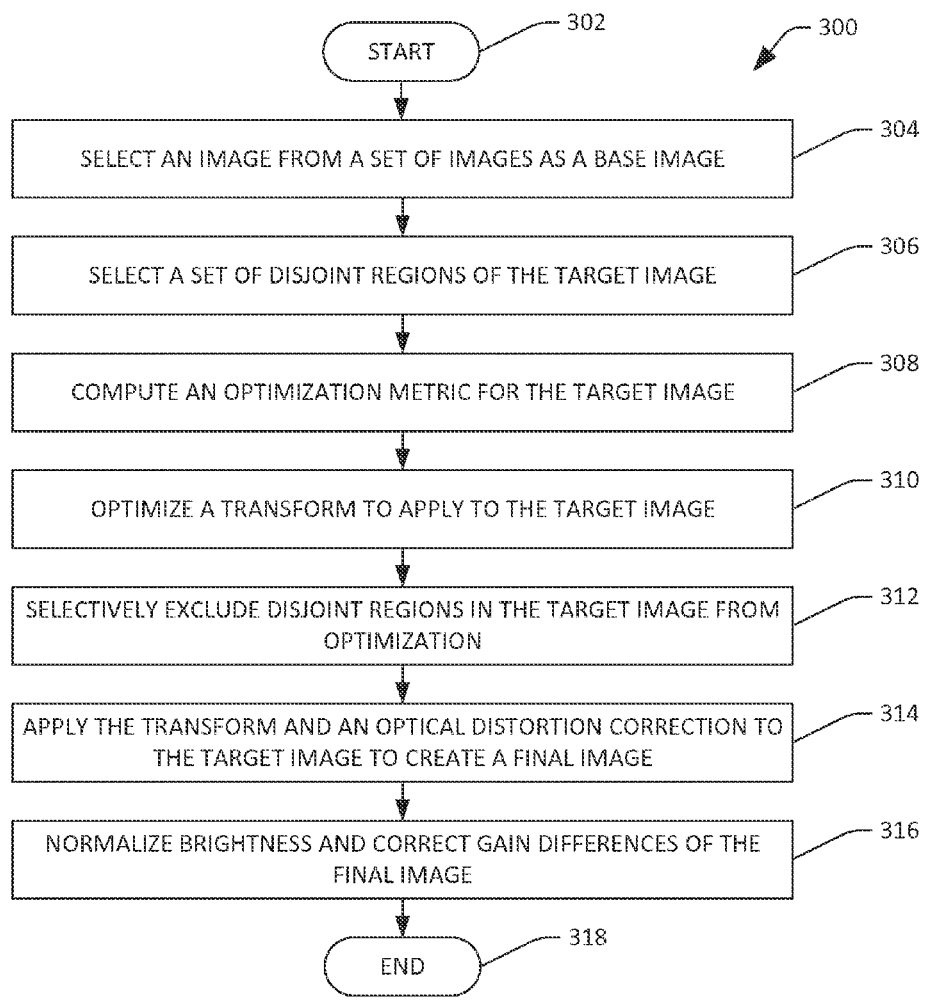

FIGS. 2-3 illustrate exemplary methodologies that facilitate registering a target image with a base image. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 2, an exemplary methodology 200 that facilitates registering a target image with a base image is illustrated. The methodology 200 begins at 202, and at 204, a set of images is received, wherein the set of images comprises a base image and a target image. As noted above, the base image can be automatically selected from the set of images based upon respective timestamps assigned to images in the set of images. Alternatively, the base image can be manually selected from the set of images. Furthermore, one or more preprocessing acts can be undertaken on images in the set of images. Such preprocessing acts optionally include identifying "dead" or "hot" pixels in images, correcting optical distortion in images, correcting gain and offset in images, etc.

At 206, the target image is divided into a plurality of uniform disjoint regions. At 208, a set of disjoint regions is selected from the plurality of uniform disjoint regions. In an exemplary embodiment, the set of disjoint regions can include at least two disjoint regions. For example, a number of disjoint regions in the set of disjoint regions can be less than or equal to a predefined threshold. Further, the set of disjoint regions may be selected by computing, for each disjoint region in the plurality of disjoint regions, a respective selection metric value, and selecting a threshold number of disjoint regions with highest selection metric values as the set of disjoint regions. In another example, selecting the set of disjoint regions can include computing a Jacobian of a feature-based estimate of a transform of the target image that is to be employed to register the target image with the base image, and selecting the set of disjoint regions from the plurality of uniform disjoint regions based upon the computing of the Jacobian of the feature-based estimate of the transform.

Additionally, in an example, selecting the set of disjoint regions from the plurality of uniform disjoint regions can optionally comprise identifying that a region in the plurality of uniform disjoint regions comprises a moving entity, and selectively excluding the region from inclusion in the set of disjoint regions based upon the identifying that the region comprises the moving entity. When performing such identifying, disjoint regions in a candidate set of disjoint regions can be partitioned into a first partition and a second partition, the first partition including at least one region and the second partition including at least one region. A registration metric value is then computed for the first partition. The partitioning of the disjoint regions and computing of the registration metric value may be iterated for different binary partitions of the disjoint regions, and a particular partitioning may be selected based on the computed registration metric values. The at least one region in the second partition is selectively excluded from being included in the set of disjoint regions based upon the computing of the registration metric value for the first partition.

At 210, a transform to be applied to the target image is optimized. Such optimizing is based upon the selecting of the set of disjoint regions from the plurality of uniform disjoint regions. For instance, the transform can be one of a translation or shift transform, similarity transform, an affine transform, or a projective transform. At 212, the transform is applied to pixels of the target image, and the target image is thus registered with the base image. The methodology 200 completes at 214.

Referring now to FIG. 3, another methodology 300 that facilitates registering a target image with a base image is illustrated. The methodology 300 begins at 302, and at 304, a base image is selected from images in a set of images. The set of images also includes a target image that is to be registered with the selected base image.

At 306, a set of disjoint regions of the target image is selected, wherein such set of disjoint regions can be selected based upon a selected transform. At 308, an optimization metric for the target image is computed based at least in part upon the selected set of disjoint regions (and thus the selected transform). At 310, the selected transform to be applied to the target image in order to register the target image with the base image is optimized based upon the optimization metric computed at 308. Optionally, at 312, regions in the set of disjoint regions selected at 306 are selectively excluded (e.g., such regions are identified as potentially including moving elements). A method that can be employed in connection with identifying inconsistent regions (and thus excluding such inconsistent regions) is set forth below.

At 314, the transform and an optical distortion correction are applied to the target image in order to register the target image with the base image (and thus generate a final image). By applying the optical distortion correction during registration rather than as a preprocessing act, an interpolation process need only be applied to the target image one time during registration. At 316, brightness of the final image is normalized and gain differences of the final image are corrected. The methodology concludes at 318.

Figure 4:
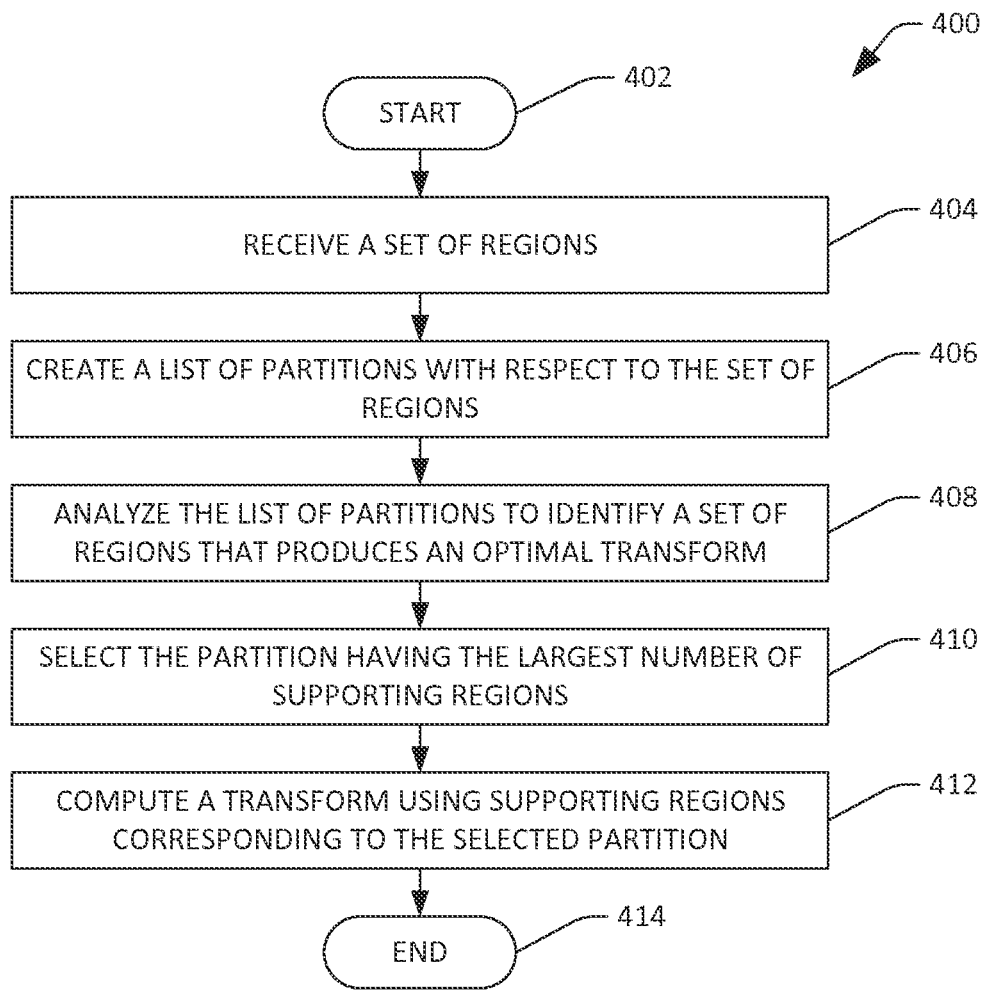

Referring now to FIG. 4, an exemplary methodology 400 for detecting inconsistencies between regions in a base image and regions in a target image in connection with registering the target image with the base image is illustrated. The methodology 400 starts at 402, and at 404 a set of regions is received. Pursuant to an example, the set of regions can be arbitrarily-shaped disjoint regions, selected as described above with respect to the region selector component 118. At 406, a list of partitions for the set of regions is created. Each partition in the list of created partitions includes two sets: putative inliers and putative outliers. Further, in an example, a partition in the list of created partitions can be composed entirely of putative inliers (e.g., the putative outliers set is empty).

At 408, the list of partitions is analyzed to identify a set of regions that produces an optimal transform. During the analyzing of 408, each partition in the list is selected, and for a respective partition, a corresponding transform is computed (e.g., via optimization) using only regions in its putative inliers set. Using this transform, the registration metric is evaluated for each region individually (in both the putative inlier and putative outlier set). For each region having a metric above a defined threshold can be considered as "supporting" the postulated transform, while regions having a metric below the defined threshold can be considered as "not supporting" the postulated transform. For the respective partition, the number of supporting regions is recorded. Accordingly, each partition in the list of partitions will have a computed number of supporting regions recorded there-for.

At 410, the partition having the largest number of supporting regions is identified, and at 412, a transform is computed (via optimization) using each supporting region identified for the identified partition. The methodology 400 completed at 414.

Figure 5:
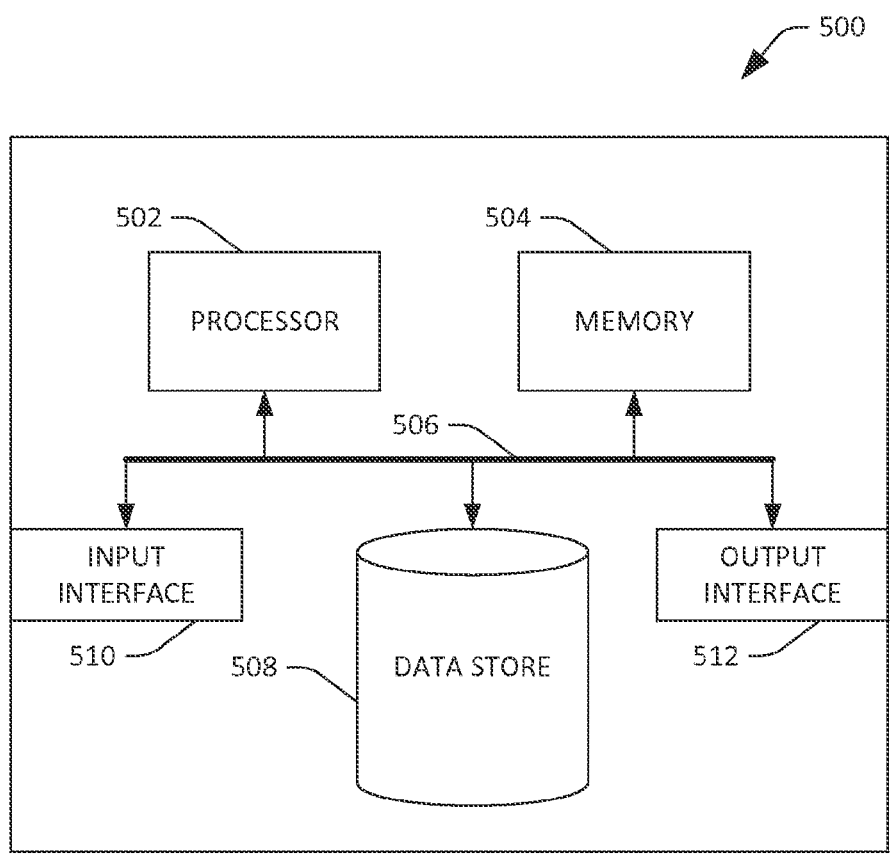
FIG. 5 is an exemplary computing system.

Referring now to FIG. 5, a high-level illustration of an exemplary computing device 500 that can be used in accordance with the systems and methodologies disclosed herein is illustrated. For instance, the computing device 500 may be used in a system that registers a target image with a base image. By way of another example, the computing device 500 can be used in a system that registers a plurality of target images to a base image. The computing device 500 includes at least one processor 502 that executes instructions that are stored in a memory 504. The instructions may be, for instance, instructions for implementing functionality described as being carried out by one or more components discussed above or instructions for implementing one or more of the methods described above. The processor 502 may access the memory 504 by way of a system bus 506. In addition to storing executable instructions, the memory 504 may also store a set of images.

The computing device 500 additionally includes a data store 508 that is accessible by the processor 502 by way of the system bus 506. The data store 508 may include executable instructions, a set of images, a disjoint region of an image, etc. The computing device 500 also includes an input interface 510 that allows external devices to communicate with the computing device 500. For instance, the input interface 510 may be used to receive instructions from an external computer device, from a user, etc. The computing device 500 also includes an output interface 512 that interfaces the computing device 500 with one or more external devices. For example, the computing device 500 may display text, images, etc. by way of the output interface 512.

Additionally, while illustrated as a single system, it is to be understood that the computing device 500 may be a distributed system. Thus, for instance, several devices may be in communication by way of a network connection and may collectively perform tasks described as being performed by the computing device 500.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method executed by a processor of a computing device, the method comprising:
    receiving a set of images, the set of images comprising a base image and a target image that is to be registered with the base image, the target image comprising a plurality of pixels;
    dividing the target image into a plurality of arbitrarily-shaped disjoint regions;
    selecting a set of disjoint regions from the plurality of arbitrarily-shaped disjoint regions, wherein selecting the set of disjoint regions comprises:
        computing, for each disjoint region in the plurality of disjoint regions, a respective selection metric value; and
        selecting a threshold number of disjoint regions with highest selection metric values as the set of disjoint regions; and
    optimizing a metric over the set of arbitrarily-shaped disjoint regions to compute a transform, the transform usable to register the target image with the base image.

2. The method of claim 1, wherein the transform is one of a translation transform, geometric transform, similarity transform, affine transform, or a projective transform.

3. The method of claim 1, wherein a number of disjoint regions in the set of disjoint regions is less than or equal to a predefined threshold.

4. The method of claim 1, wherein selecting the set of disjoint regions comprises:
    computing a Jacobian of a feature-based estimate of the transform; and selecting the set of disjoint regions from the plurality of uniform disjoint regions based upon the computing of the Jacobian of the feature-based estimate of the transform.

5. The method of claim 1, further comprising:
receiving an indication that a pixel in the target image is a dead pixel or a hot pixel; and
replacing a value of the pixel in the target image with a non-inclusion marker.

6. The method of claim 5, further comprising:
during a processing act on the target image, propagating the non-inclusion marker such that pixel values that are dependent upon the non-inclusion marker are assigned respective non-inclusion markers, and wherein optimizing the metric is based upon the respective non-inclusion markers.

7. The method of claim 1, wherein selecting the set of disjoint regions from the plurality of uniform disjoint regions comprises:
identifying that a region in the plurality of uniform disjoint regions comprises a moving entity; and
selectively excluding the region from inclusion in the set of disjoint regions based upon the identifying that the region comprises the moving entity.

8. The method of claim 7, wherein identifying that the region in the plurality of disjoint regions that comprises the moving entity comprises:
partitioning disjoint regions in the target image into a first partition and a second partition, the first partition including at least one region and the second partition including at least one region;
computing a registration metric value for the first partition; and
selectively excluding the at least one region in the second partition from being included in the set of disjoint regions based upon the computing of the registration metric value for the first partition.

9. A computing device, comprising:
a processor; and
memory that comprises a registration component that receives a set of images, the set of images comprising a base image and a target image, the registration component registering the target image with the base image, the registration component comprising:
a divider component that divides the target image into a plurality of disjoint regions;
a region selector component that selects a set of regions from the plurality of disjoint regions, wherein the region selector component selects the set of regions based at least in part upon a respective selection metric value computed for each disjoint region in the plurality of disjoint regions, wherein the set of regions comprise a threshold number of disjoint regions with highest selection metric values; and
an optimizer component that optimizes a transform to be applied to the target image using only the set of regions selected from the plurality of disjoint regions, regions in the set of regions being less than all regions in the plurality of disjoint regions, wherein the registration component registers the target image with the base image based upon the transform optimized by the optimizer component.

10. The computing device of claim 9, the computing device further comprising a selector component that selects the base image from the set of images based upon a timestamp assigned to the base image.

11. The computing device of claim 9, the registration component further comprising a metric computer component that computes an optimization metric for the target image based on the set of regions selected by the region selector component, wherein the optimizer component optimizes the transform based at least in part upon the optimization metric.

12. The computing device of claim 9, wherein the region selector component selects the set of regions based at least in part upon a Jacobian of a feature-based estimate of the transform.

13. The computing device of claim 9, the registration component further comprising a distortion corrector component that performs optical distortion correction on the target image during registration of the target image with the base image.

14. The computing device of claim 9, the memory further comprising a preprocessor component that performs a processing act on an image in the set of images.

15. The computing device of claim 14, wherein the processing act performed by the preprocessor component comprises replacement of a value of a pixel in the target image with a non-inclusion marker.

16. The computing device of claim 9, the registration component further comprising a consistency detector component that identifies a region in the plurality of uniform disjoint regions that comprises a moving entity, the consistency detector component selectively excludes the region from inclusion in the set of disjoint regions based upon the region being identified by the consistency detector component as comprising the moving entity.

17. The computing device of claim 9 being a mobile computing device.

* * * * *